United States Patent [19]
Scheele et al.

[11] Patent Number: 5,977,683
[45] Date of Patent: *Nov. 2, 1999

[54] BRUSH-HOLDER PLATE AND ELECTRIC MOTOR COMPRISING THIS BRUSH-HOLDER PLATE

[75] Inventors: Hubert Scheele, Weinsberg; Walter Huber, Bietigheim-Bissingen; Harro Buhl, Kirchheim, all of Germany

[73] Assignee: ITT Manufacturing Enterprises Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/793,759
[22] PCT Filed: Aug. 30, 1995
[86] PCT No.: PCT/EP95/03406
  § 371 Date: Sep. 30, 1997
  § 102(e) Date: Sep. 30, 1997
[87] PCT Pub. No.: WO96/07230
  PCT Pub. Date: Mar. 7, 1996

[30] Foreign Application Priority Data
Aug. 31, 1994 [DE] Germany ............... 44 30 954

[51] Int. Cl.⁶ .............. H01R 39/38; H01R 39/40; H02K 15/00
[52] U.S. Cl. ............ 310/242; 310/42; 310/247
[58] Field of Search .................. 310/239, 240, 310/242, 245, 247, 241, 244, 246, 42

[56] References Cited

U.S. PATENT DOCUMENTS

| | | |
|---|---|---|
| 4,293,789 | 10/1981 | King ............................... 310/239 |
| 4,516,047 | 5/1985 | Duverger ......................... 310/230 |
| 5,006,747 | 4/1991 | Stewart et al. .................. 310/239 |
| 5,089,735 | 2/1992 | Sawaguchi et al. ............ 310/88 |

FOREIGN PATENT DOCUMENTS

| | | |
|---|---|---|
| 2558018 | 1/1984 | France . |
| 2360182 | 12/1975 | Germany . |
| WO9607230 | 7/1996 | WIPO . |

OTHER PUBLICATIONS

Search Report of the German Patent Office for Application P4430954.6.

Merriam Webster's Collegiate Dictionary, Tenth edition, Merriam–Webster, Inc., p. 383, 1997.

*Primary Examiner*—Nestor Ramirez
*Assistant Examiner*—Dang Dinh Le
*Attorney, Agent, or Firm*—J. Gordon Lewis

[57] ABSTRACT

An electric motor has brushes preassembled in casings on a brush holder plate. To keep the brushes in the casings as long as a collector of the motor has not yet been fitted, a retaining ring in front of the brushes is installed, this retaining ring being gradually replaced by the collector when the latter is fitted. The retaining ring is introduced into a specially provided space of an accommodating chamber in a bearing support, provided with a slot and thus resilient in a radial direction. Therefore, the ring may abut with preload on the outside walls of the accommodating chamber. Frictional engagement between the ring and the walls of the accommodating chamber is established, preventing rattling noise or wear as a result of movement of the retaining ring.

2 Claims, 1 Drawing Sheet

5,977,683

BRUSH-HOLDER PLATE AND ELECTRIC MOTOR COMPRISING THIS BRUSH-HOLDER PLATE

This is a 371 of Application No. PCT/EP95/03406, filed Aug. 30, 1995.

BACKGROUND OF THE INVENTION

The present invention relates to a brush holder plate, attached to which are casings accommodating brushes, the brushes extending under spring load in a radial direction towards a central aperture in the brush holder plate. Further, a retaining ring is provided on whose external periphery the brushes abut, the retaining ring being slidable in an axial direction.

The retaining ring serves to facilitate the assembly. Initially, the retaining ring keeps the brushes in retracted positions. As soon as the brush holder plate is slipped on the armature shaft of the motor and the collector secured to it, the collector gradually displaces the retaining ring from its position. As a result of that, the brushes slide from the external periphery of the retaining ring towards the periphery of the collector. This permits an easy and rapid assembly.

German patent application No. 41 05 349 discloses such an arrangement, for example. The holder or prop ring described in the application has a rigid design. During the assembly, the holder is slid by the collector into an accommodating chamber provided in a support of the electric motor housing.

Because it is impossible to conform the outside diameter of the retaining ring exactly to the inside diameter of the accommodating chamber, the retaining ring is likely to have a certain clearance in relation to the accommodating chamber. This means that rattling noise cannot be prevented. Also, wear is caused by the movement of the retaining ring relative to the housing which possibly limits the operability of the electric motor.

SUMMARY OF THE INVENTION

To avoid these shortcomings, it is proposed that the retaining ring of the brush holder plate has a radially resilient design.

The associated electric motor includes an accommodating chamber having a diameter which is smaller than the diameter of the retaining ring in the absence of counteracting load. The result is that the retaining ring, when it is slipped into the accommodating chamber during the assembly, is expanded due to its resilient design and moves into yielding abutment on the walls of the accommodating chamber.

The friction forces between the wall of the accommodating chamber and the outside periphery of the retaining ring, which are caused by the spring forces, prevent movement of the retaining ring. Thus, the retaining ring is frictionally locked in the accommodating chamber.

To generate the radial spring effect of the ring, the ring is made of an elastic material. Further, a slot is provided so that the retaining ring is open in one point and may be expanded in the absence of counteracting forces.

To reliably fix the ring in position on the casings during preassembly, the ring may include a circumferential edge to extend radially outwardly and abut on the bottom side of the casings in the preassembly position.

The support (the accommodating chamber of which houses the retaining ring after the assembly) may be part of a pump housing or transmission housing.

The brush holder plate is secured directly to the support or is integrally designed with the support, and the accommodating chamber of the support is arranged coaxially to the aperture in the brush holder plate.

One embodiment will be explained in detail hereinbelow, making reference to three Figures.

BRIEF DESCRIPTION OF THE DRAWINGS

FIG. 1 is a cross-sectional view and

FIG. 2 is a top view of the brush holder plate.

DETAILED DESCRIPTION OF THE INVENTION

Figure 1:
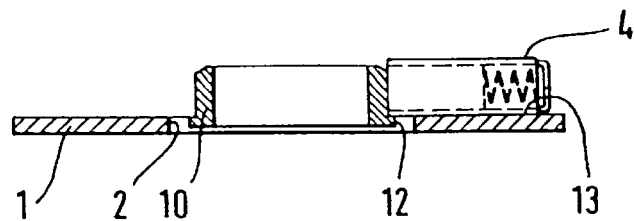
FIGS. 1 and 2 show views of a brush holder plate, i.e.
Figure 2:
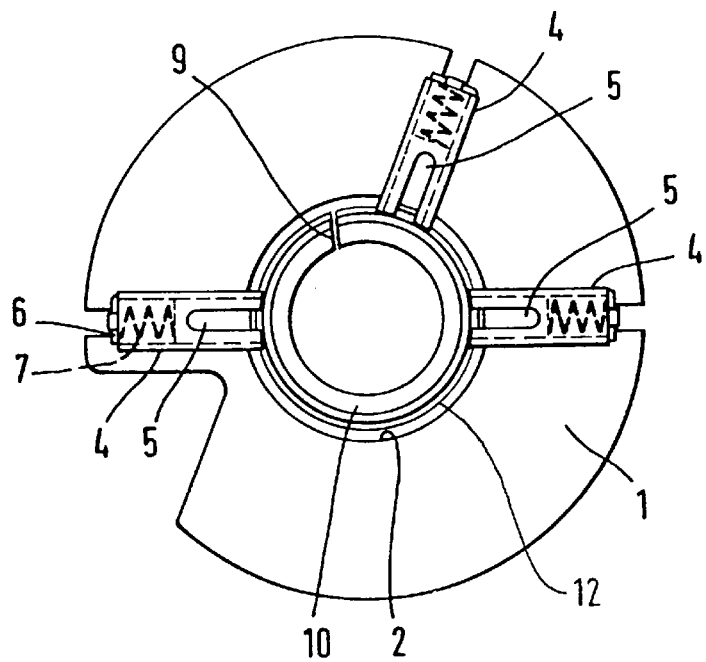

Initially, FIGS. 1 and 2 will be referred to. Reference numeral 1 designates the holder plate (brush holder plate) in total. The brush holder plate has a generally circle-ring shaped design, i.e., its outer edge is conformed to the contour of the housing of the electric motor. Aperture 2 in the brush holder plate is of circular design and has a diameter which mainly corresponds to the diameter of the collector 3. A plurality of casings 4 including brushes 5 are arranged on the holder plate.

The casings 4 are grouped around the inside aperture 2, orientation of longitudinal axes of the casings coinciding with the direction of continuation of radii of the aperture 2.

Normally, a casing 4 is folded from a pre-punched sheet metal. The outside contour of the casing is generally square-shaped, and the frontal end of the casing is open so that the mounted brush 5 projects from it.

The rear side is closed by a cover plate 6. A spring 7 is provided between the brush 5 and the cover plate 6 to push the brush 5 inwardly, thereby ensuring a proper electrically conducting contact between the brush 5 and the collector 3. The springs 7 (in the absence of an appropriate retaining mechanism) cause the brushes to be pressed in front of the aperture, with the result that the brush holder plate would be prevented from moving onto the collector 3.

A retaining ring 10 is used to eliminate this drawback. As can be taken from FIG. 1, the retaining ring has a height which corresponds roughly to the height of the casing 4. In the position shown, the retaining ring has an outside diameter which generally corresponds to the diameter of an imaginary circle, adjacent to which are the inner frontal ends of the casings 4.

Therefore, the springs 7 press the brushes 5 against the external periphery of the retaining ring 10, with the result that the brushes are prevented from moving in front of the aperture 2. Further, the retaining ring has a circumferential edge 12 which bears against the base side 13 of the casings 4 but does not contact the brush bolder plate 1 (as shown in FIG. 1). The base side of the casings is the side which is connected to the brush holder plate.

Figure 3:
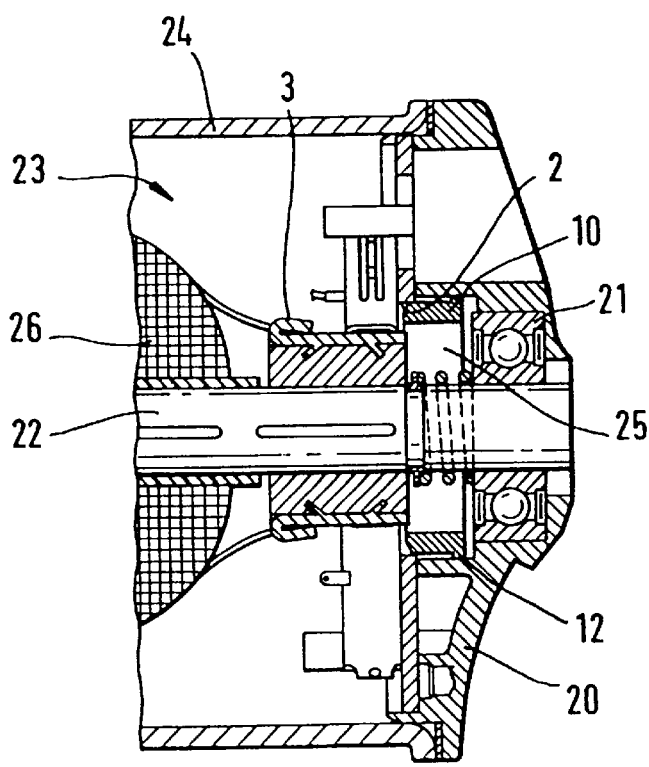
FIG. 3 is a cross-sectional view of an electric motor after the assembly and the resulting new position of the retaining ring.

FIG. 3 shows an electric motor after its assembly.

The brush holder plate 1 is connected to a bearing support 20. Bearing support 20 is part of a housing which encloses a transmission or a pump. The bearing support 20 carries a bearing 21 through which extends an armature shaft 22 of an electric motor 23. Collector 3 and rotor coils 26 are placed on the shaft 22. Rotor coils 26 are connected to the collector 3. The electric motor 23 further includes a bowl-shaped casing 24 adapted to be slipped on the bearing support 20.

An accommodating chamber 25 is provided in the bearing support 20. Accommodating chamber 25 has a cylindrical design and opens towards the side of the support 20 which points to the interior of the electric motor housing after the assembly of the electric motor.

The diameter of the accommodating chamber 25 is roughly identical with the diameter of the aperture 2 in the brush holder plate. Because the inner ends of the casings 4 project slightly beyond the edge of the inner aperture, and the circle enclosed by these ends roughly corresponds to the diameter of the collector, the diameter of the collector is smaller than the diameter of the accommodating chamber 25.

For the assembly of the electric motor, the bearing 21 is initially inserted into the bearing accommodating means which is adjacent to the accommodating chamber 25. Subsequently, the brush holder plate, unless it is integrally designed with the bearing support, is mounted on the bearing support. The retaining ring 10 is still in front of the open ends of the casings 4 so that the brushes cannot be urged thereinto. Thereafter, the armature shaft 4 with the collector 3 is slipped onto the bearing support. In doing so, the collector 3 first moves into abutment on the retaining ring to push it to the right, as shown in the embodiment of FIG. 3. Collector 3 gradually displaces the ring, thereby shifting it in the direction of the accommodating chamber 25.

Thus, the collector 3 gradually adopts the position of the retaining ring so that the brushes 4, without a change of their radial position, move into contact with the collector 3.

As soon as the collector 3 has pushed the retaining ring 10 entirely out of the range of the casings 4, ring 10 is expanded due to its resilient preload and abuts on the lateral walls of the accommodating chamber. The retaining ring 10 is slotted to permit such an expanding (slot 9).

The diameter of the accommodating chamber and the radial resiliency of the retaining ring 10 are conformed to each other in such a way that the retaining ring, still under preload, moves to abut on the walls of the accommodating chamber 25. This produces a frictional engagement between the ring and the walls of the accommodating chamber ensuring an immovable position of the ring in the bearing support 20. Rattling noise and undesirable wear is thereby prevented.

Subsequently, the bowl-shaped housing 24 is mounted on the bearing support, thereby completing the motor.

We claim:

1. An electric motor comprising:

a collector electrically connected to rotor coils, the collector and the rotor coils being placed on a shaft;

a cylindrical collector housing which is closed on one end by a bearing support, the support having a cylindrical chamber;

a holder plate for brushes that has a central aperture receiving the shaft during assembling the motor; and a retaining ring for the brushes that is located in the aperture and keeps the brushes in a retracted position prior to said assembling, said retaining ring having a radially outwardly pointing circumferential edge that abuts the brushes as to restrict axial movement of said retaining ring in one direction but does not contact the holder plate, said retaining ring adapted to be displaced by said shaft during said assembling, the cylindrical chamber accommodating the displaced retaining ring after said assembling;

wherein a diameter of the accommodating chamber is smaller than a diameter of the retaining ring in the absence of counteracting load, the retaining ring having an elastic design in a radial direction and being adapted to be frictionally locked in the accommodating cylindrical chamber after said assembling, to thus eliminate movement of the retaining ring relative to chamber walls and rattling noise and wear caused thereby.

2. The electric motor as claimed in claim 1, wherein said retaining ring includes a slot to provide the elastic design of said retaining ring.

* * * * *